US005842338A

United States Patent [19]
Forster et al.

[11] Patent Number: 5,842,338
[45] Date of Patent: Dec. 1, 1998

[54] REPLACEABLE BRIDGE-LINK WITH BASE

[75] Inventors: Barry C. Forster, Mississauga; Jorgen O. Bernt, Oakville, both of Canada

[73] Assignee: J. O. Bernt & Associates Limited, Ontario, Canada

[21] Appl. No.: 907,508

[22] Filed: Aug. 8, 1997

[51] Int. Cl.⁶ .................................................. F16G 15/02
[52] U.S. Cl. ..................................... 59/85; 59/93; 59/78
[58] Field of Search .................................. 59/78, 84, 85, 59/93

[56] References Cited

U.S. PATENT DOCUMENTS 2,537,405  1/1951  Gilbert ........................................ 59/85

FOREIGN PATENT DOCUMENTS 2821647  12/1979  Germany .................................... 59/85
2844616   4/1980  Germany .................................... 59/78
  14255   of 1888  United Kingdom ....................... 59/85

*Primary Examiner*—David Jones

[57] ABSTRACT

A bridge-link and base replace a kiln hanger for chains. The base is welded to the kiln and is provided with translation surfaces to allow a bridge link to be mounted thereon. The bridge-link may be mounted with a chain link pre attached. The bridge link is mounted to receive almost all wear in use by comparison with the base. When a bridge-link is worn it may easily be removed and replaced.

12 Claims, 4 Drawing Sheets

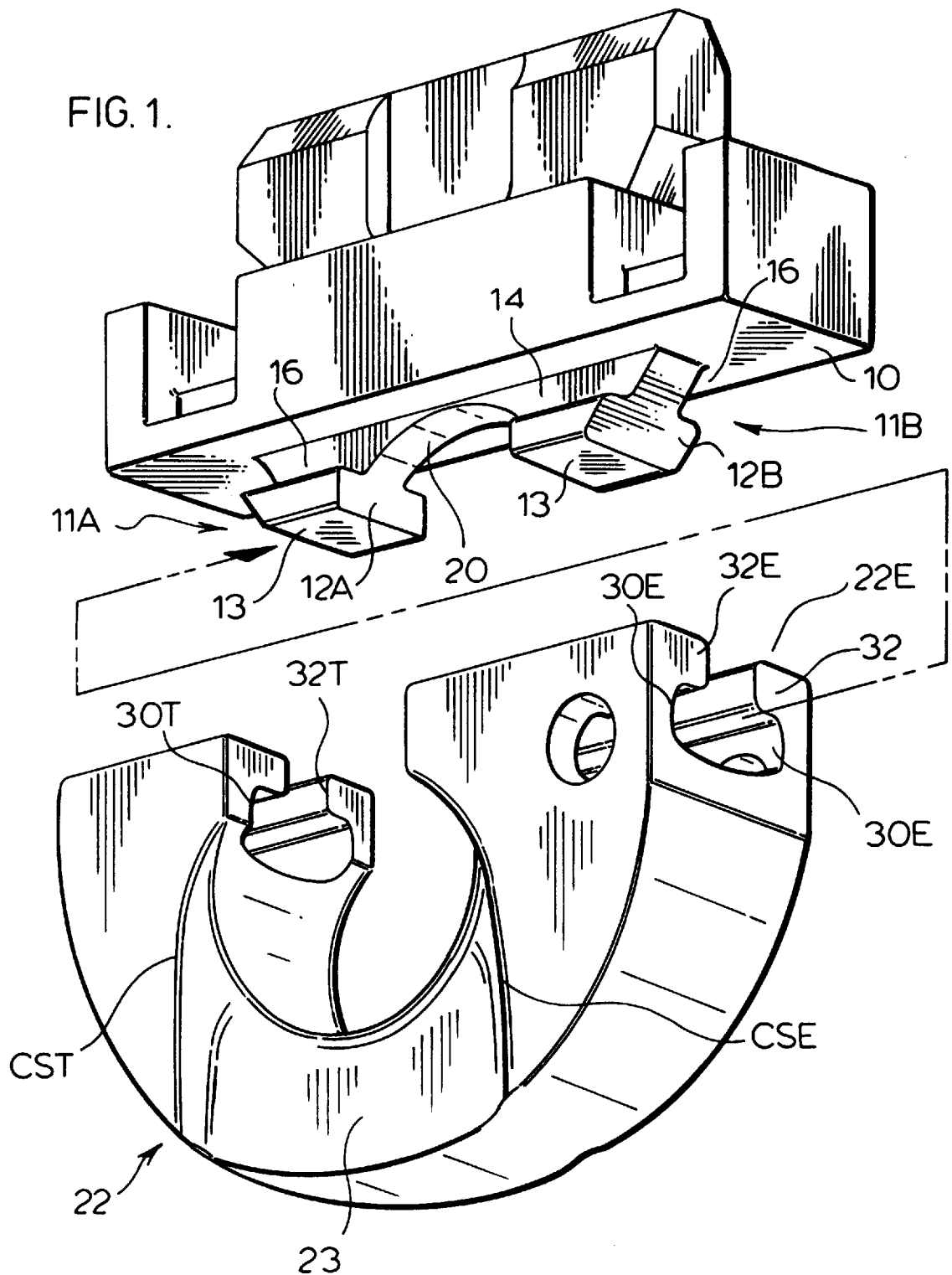

REPLACEABLE BRIDGE-LINK WITH BASE

This invention relates to a bridge-link with base for a rotary kiln or the like. A rotary kiln typically carries powder in one direction while hot gases travel in the opposite direction. Chains hanging from the walls absorb heat from the gases while suspended above the powder and transfer such heat to the powder during their (the chain's) immersion therein as the kiln rotates.

Such chains are subject to wear and breakage and it is very difficult in a kiln even when stationary, to remove or repair a broken chain or to install a new chain.

In current practice, it is necessary to completely remove the old hanger and the refractory lining when the tops or working part of the hangers are worn out.

This is an extremely expensive and time consuming process. This invention provides a replaceable bridge-link which is mounted on a base which base is attached to the kiln inside wall.

The bridge-link provides the hanger for suspending chain link or shackle. The replaceable bridge-link provides easy replacement of broken or worn chain without having to disturb or remove the kiln liner.

This invention provides a bridge-link which is mounted on a base attached to the kiln wall. The bridge-link is designed to facilitate replacement or removal of a broken chain and allows easy replacement of a bridge-link by another, the latter with a regular chain or chain link attached.

The bridge-link is also preferably shaped when installed in a kiln, to receive a shackle without removal of the bridge-link. Thus, when desired a hasty repair by attaching a shackle attached chain may be made.

The bridge-link and base are arranged so that substantially all wear, in use, is on the bridge-link rather than the base. Thus a worn bridge-link may be removed from the base and a new bridge-link attached to the base, for further attachment of a kiln chain.

In accord with the invention, the base is provided for attachment by welding to a kiln wall in any desired manner usually extending in the peripheral direction or within 10° or 20° thereof. The base is designed so that, when attached to the kiln wall, a rib thereon is provided with translation surfaces, so that complementary bridge-link surfaces may slide thereon parallel to the base extension direction.

A bridge-link is provided with complementary translation surfaces so that the bridge-link may be moved into a position where it is suspended by the rib. The complementary surfaces are arranged so that the rib on the base will support a bridge-link, and a chain attached thereto, in any orientation of the kiln, but most importantly, when the bridge-link and attached chain are directly below the base. This orientation is where the maximum wear on the bridge-link will take place. The bridge-link in this position absorbs substantially all the wear and thus protects the rib and base.

The bridge-link and rib are preferably designed to define a relative suspension position, in the sliding direction wherein said bridge-link and rib define an aperture for a kiln chain link or shackle.

The bridge-link and base are preferably designed so that, in the suspension position, substantially all wear surfaces are on the bridge-link and none on the fib or base so that a worn bridge-link may be replaced without concern about the base. Similarly the bridge-link may be replaced if (the chain it attaches is broken).

In its preferred design the rib section (perpendicular to the sliding direction) has a wider portion spaced from the base and such wider portion is continued in the translation direction to an aperture gap, sufficient for the upper area of a link aperture, and then continued on the other side of the aperture gap. The bridge-link is shaped to slide on said rib and to the suspension position where stop means is provided.

The bridge-link in the suspension direction defines a downward extension of the chain link aperture.

The bridge-link extends, on the side of the aperture opposite the stop beyond the rib so that, once installed it may be held in place by a single bolt or weld spot.

In drawings which illustrate a preferred embodiment of the invention.

FIG. 1 shows an exploded view of a base, rib, and a bridge-link with the bridge-link below the rib.

Figure 4:
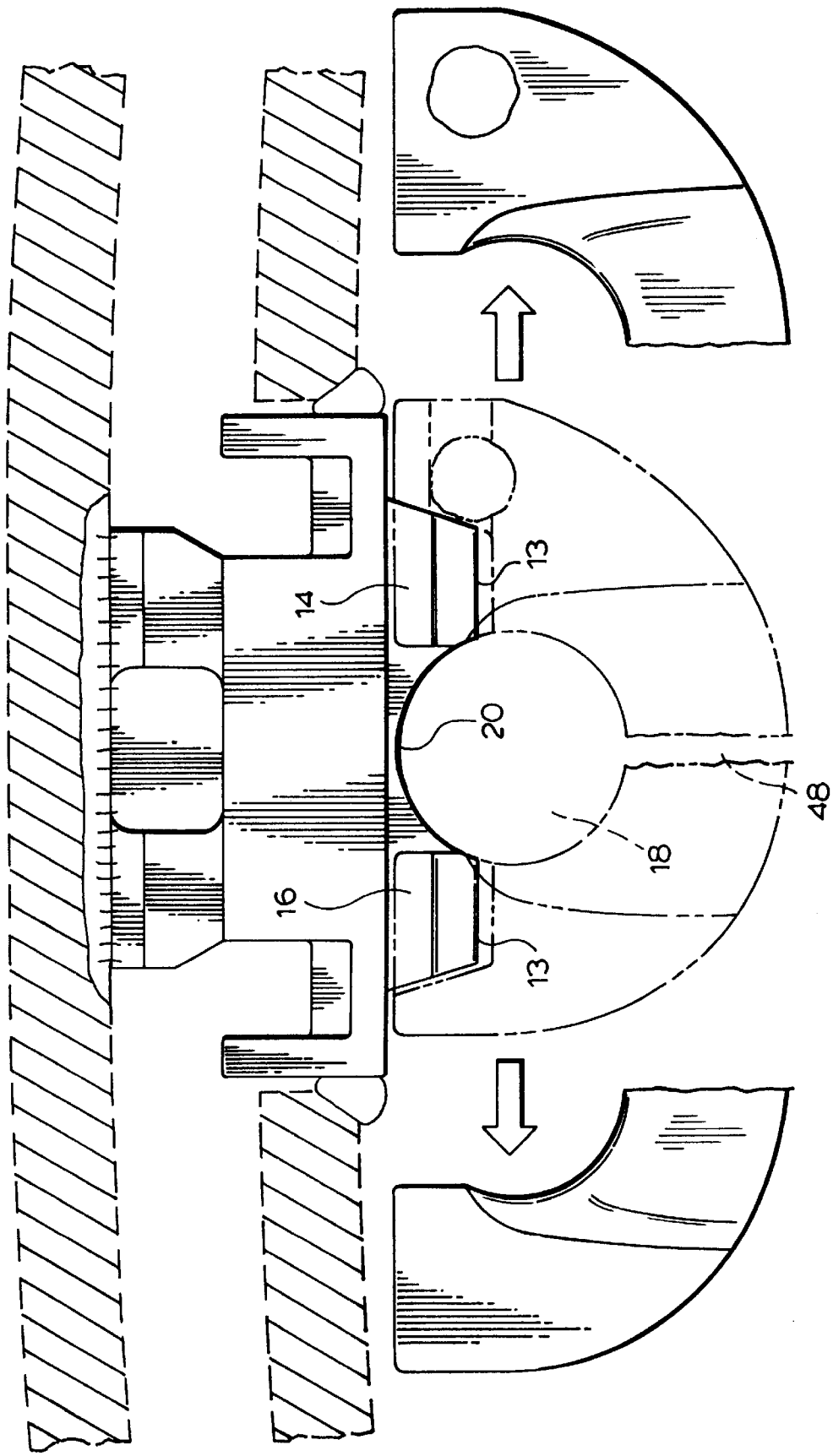

FIG. 4 demonstrates the removal of a bridge-link.

The components in question of course travel in a circular path about a kiln. Since the most wear on assembled components takes place when the chain is hanging down and the bridge-link is in the upper position of its cycle, the components are shown in the top of their path and in this position the kiln axis of rotation will be directly below.

With the desired installation as shown in the drawings the center of the kiln is downward in the drawings and the peripheral rotation direction is horizontal therein.

In the drawings a base surface 10 is directed toward the center of the kiln and attached to the kiln wall by means not shown (usually welding). Detail of the base is not described since it may vary widely and forms no part of the present invention.

Located inwardly from the base is the rib 11A and 11B preferably of a dovetail form, preferably extending generally perpendicular to the kiln radius and defining in section a surface of translation having a widened area 12 connecting to the base per se by a narrower neck 14 which defines outwardly facing grooves 16 on each side.

The rib 11A, 11B is interrupted in the sliding direction to define the upper portion of a link aperture 18 which aperture preferably includes the area defined by the arc 20.

The bridge-link 22 is of a general C shape. It is widened at one free end 22E to provide the grooves 30E to slidably receive widened areas 12A and 12B and ridges 32 designed to ride in grooves of the rib. These surfaces define grooves 30E and ridges 32E are surfaces of translation and with a gap such surfaces are continued as grooves 30T and ridges 32T to stop surface 34 (FIG. 3) of the rib where the rib and link are aligned to define the aperture 18 in the suspension position.

As best shown in FIGS. 1 and 2 the central portion of the bridge-link between lines CSE and CST (FIG. 1) and symmetrically located lines on the other side of the bridge-link is narrowed to provide a smaller section which is centred beneath the aperture 36. The smaller section, narrower perpendicular to the translation direction than the remaining sections of the bridge-link allows the attachment of a shackle and through it a chain if it is not desired to take the bridge-link off to attach another chain.

Figure 2A:
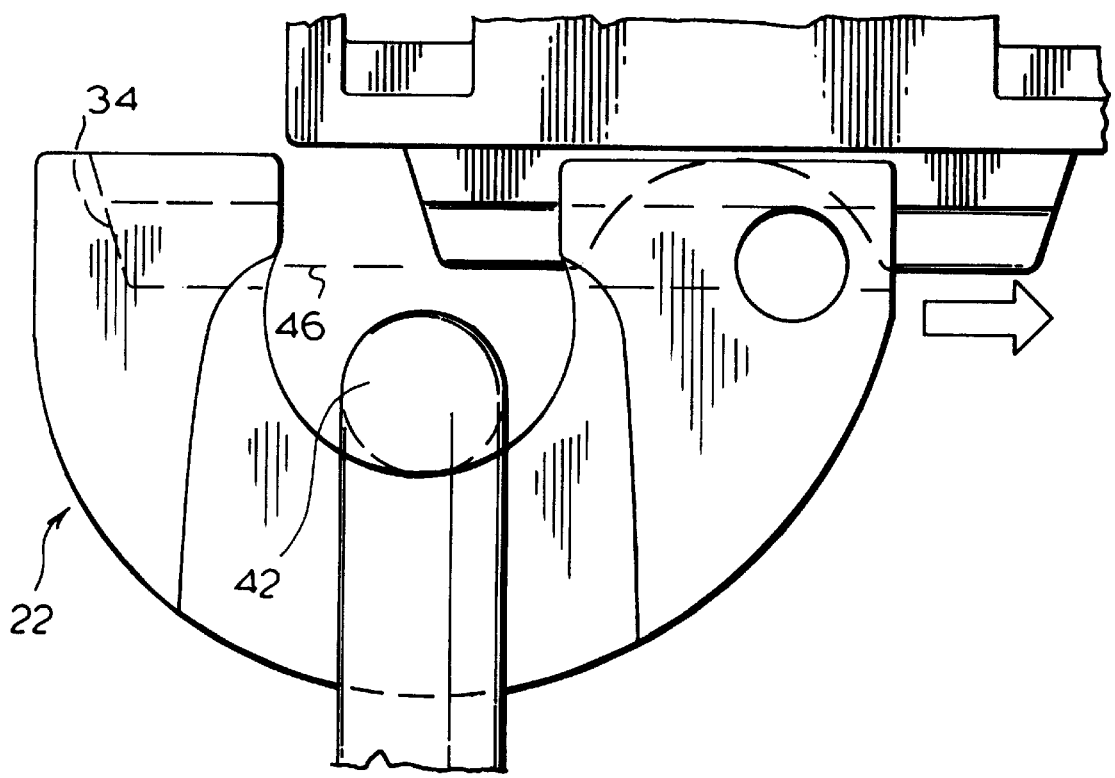
FIG. 2A shows the components of FIG. 1 partially assembled with a round section link attached.
Figure 2B:
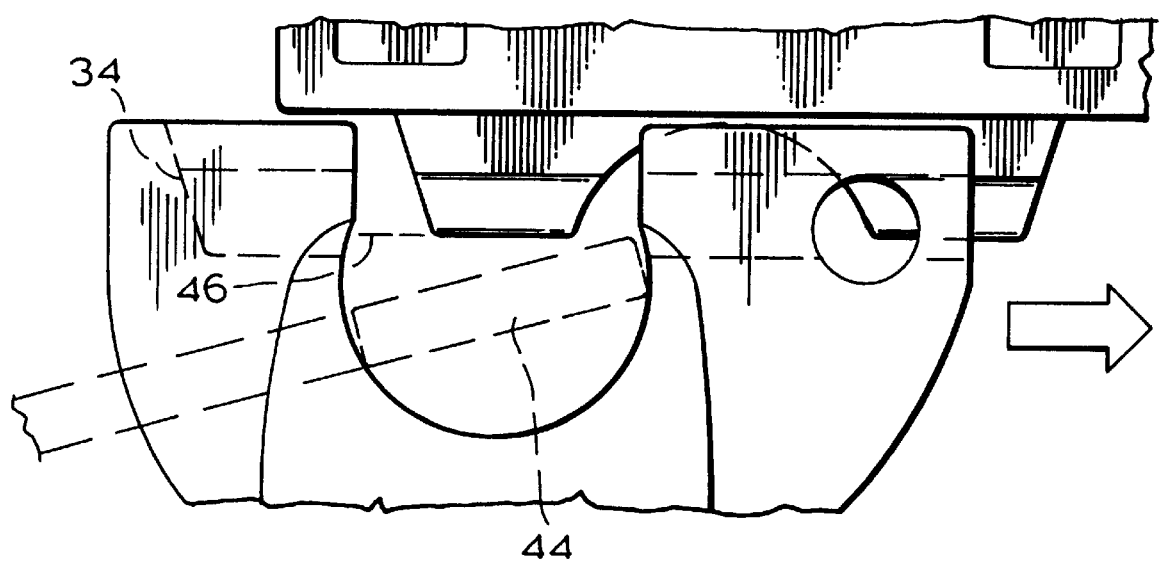
FIG. 2B shows the components of FIG. 1 partially assembled with a rectangular section link attached.

In operation then, with the rib 11 but no bridge-link in place thereon, a bridge-link 22 is connected to the first link 42 of the round section chain to be installed (Chain 42, has links of round section. Other links can be used such as the rectangular chain 44 of FIG. 2B or other suitable chain). FIGS. 2A and 2B show the aperture 18 truncated by chord 46 and chord 46 is the extension of the radially inner rib surfaces 13 and is thus the radially outer limit of the truncated aperture during sliding of the bridge-link into position on the rib. Thus the truncated aperture may accommodate a relatively large circular section link 42. It is noted that the end link 44 of a rectangular section chain may be angled during relative translation if its extent A is greater than the symmetrical height of the truncated aperture.

Thus the replaceable rib of FIG. 1 extending through the first link of a chain is slid onto the rib 12A, 12B (see also FIG. 2A, 2B) to the suspension position where it is stopped by surface 34 which acts to stop the bridge-link in the suspension position. See FIG. 3 where the bridge-link is shown in place in the suspension position.

Figure 3:
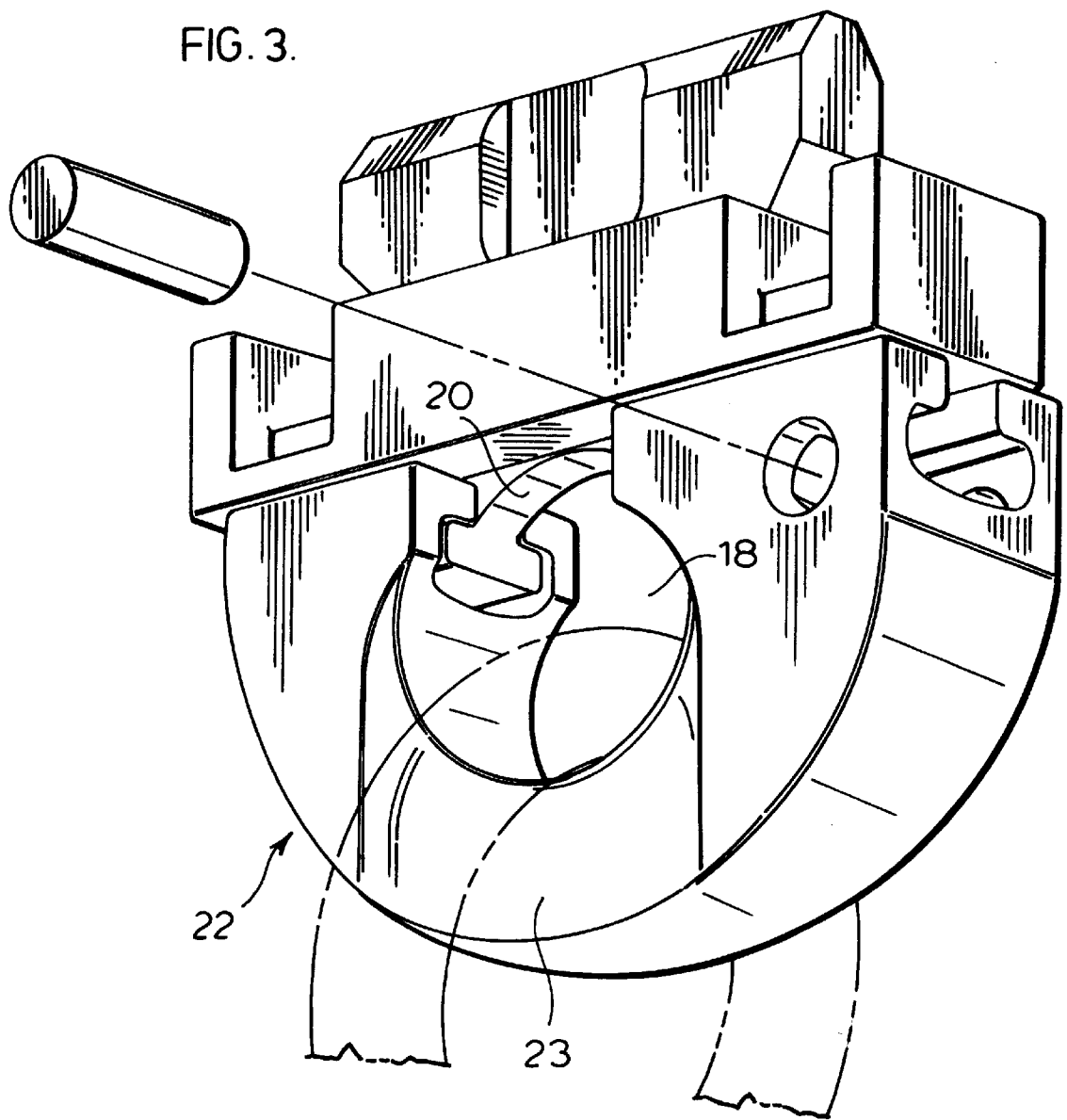
FIG. 3 shows the components of FIG. 1 in assembled position.

In the position of FIG. 3 a bolt 39 or a spot weld in the same location is applied to hold the bridge-link in position.

The attitude of the drawings shows the bridge-link in the top centre position in the kiln where it gets the most wear. Thus it will be seen that substantially no wear may be encountered by the rib and base.

When the bridge-link or the attached chian is worn the link may be subjected to a welding cut at 48 FIG. 4.

Each half of the bridge-link may then be slid off the rib at its own end. A new bridge-link looped through a chain may then be applied as previously discussed.

If a chain must be replaced and it is not desired to replace the bridge, the chain link may be cut (e.g. by a cutting torch) off the replaceable link, and a shackle attached to a chain and to the bridge-link at the narrowed position, defined by lines CST and CSE and their counterparts.

The mounting of the base and rib is stronger when the base and its translation surfaces is directed peripherally in the rotation (or reverse) direction.

We claim:

1. Bridge-link and base comprising:
    a base surface, attached to the inner wall of a rotary kiln
    a sliding translation direction,
    a rib mounted on said base surface and located outward thereof, extending in said sliding direction,
    having a first surface of translation and defining a section perpendicular to said direction,
    said section being enlarged in a location spaced from said base surface,
    a bridge-link provided with a second surface of translation shaped to slide on said first surface when interfit therewith, to define a suspension position,
    said surfaces in said suspension position allowing suspension of said bridge-link from said rib,
    said rib and bridge-link in said suspension position defining a link aperture.

2. A bridge-link as claimed in claim 1 containing a middle narrowed portion.

3. Bridge-link as claimed in claim 1 wherein stop means is provided to stop relative sliding at the suspension position.

4. Bridge-link as claimed in claim 1 wherein stop means is provided to stop relative sliding at the suspension position.

5. Bridge-link and base comprising:
    base, attached to the inner wall of a rotary kiln,
    rib attached thereto,
    a replaceable bridge-link mounted on said rib,
    said rib defining a first surface of translation, in a sliding direction,
    said bridge-link defining a second surface of translation in said sliding direction,
    said first and second surfaces being shaped to provide interlocking of said surfaces of translation, and to move relative to each other to a suspension position,
    and being arranged so that said rib will suspend said bridge-link and a chain connected thereto,
    said rib and bridge-link, in said suspension position defining an aperture for a chain link.

6. A bridge-link as claimed in claim 5 containing a middle narrowed portion.

7. Bridge-link as claimed in claim 5 wherein stop means is provided to stop relative sliding at the suspension position.

8. Bridge-link and base comprising:
    a base surface,
    a sliding translation direction,
    a rib mounted on said base surface and located outward thereof, extending in said sliding direction,
    having a first surface of translation and defining a section perpendicular to said direction,
    said section being enlarged in a location spaced from said base surface,
    a bridge-link provided with a second surface of translation shaped to slide on said first surface when interfit therewith, to define a suspension position,
    said surfaces in said suspension position allowing suspension of said bridge-link from said rib,
    said rib and bridge-link in said suspension position defining a link aperture,
    said bridge link extending beyond each end of said rib in said suspension position.

9. A bridge-link as claimed in claim 8 containing a middle narrowed portion position.

10. A bridge-link as claimed in claim 8 containing a middle narrowed portion.

11. Bridge-link as claimed in claim 8 wherein stop means is provided to stop relative sliding at the suspension position.

12. Bridge-link and base comprising:
    base,
    rib attached thereto,
    a replaceable bridge-link mounted on said rib,
    said rib defining a first surface of translation, in a sliding direction,
    said bridge-link defining a second surface of translation in said sliding direction,
    said first and second surfaces being shaped to provide interlocking of said surfaces of translation,
    and to move relative to each other to a suspension position,
    and being arranged so that said rib will suspend said bridge-link and a chain connected thereto,
    said rib and bridge-link, in said suspension position defining an aperture for a chain link,
    said bridge link extending beyond each end of said rib in said suspension position.

* * * * *